I. P. FRINK.
Reflector.
No. { 146, 1,249. }
Reissued Dec. 24, 1861
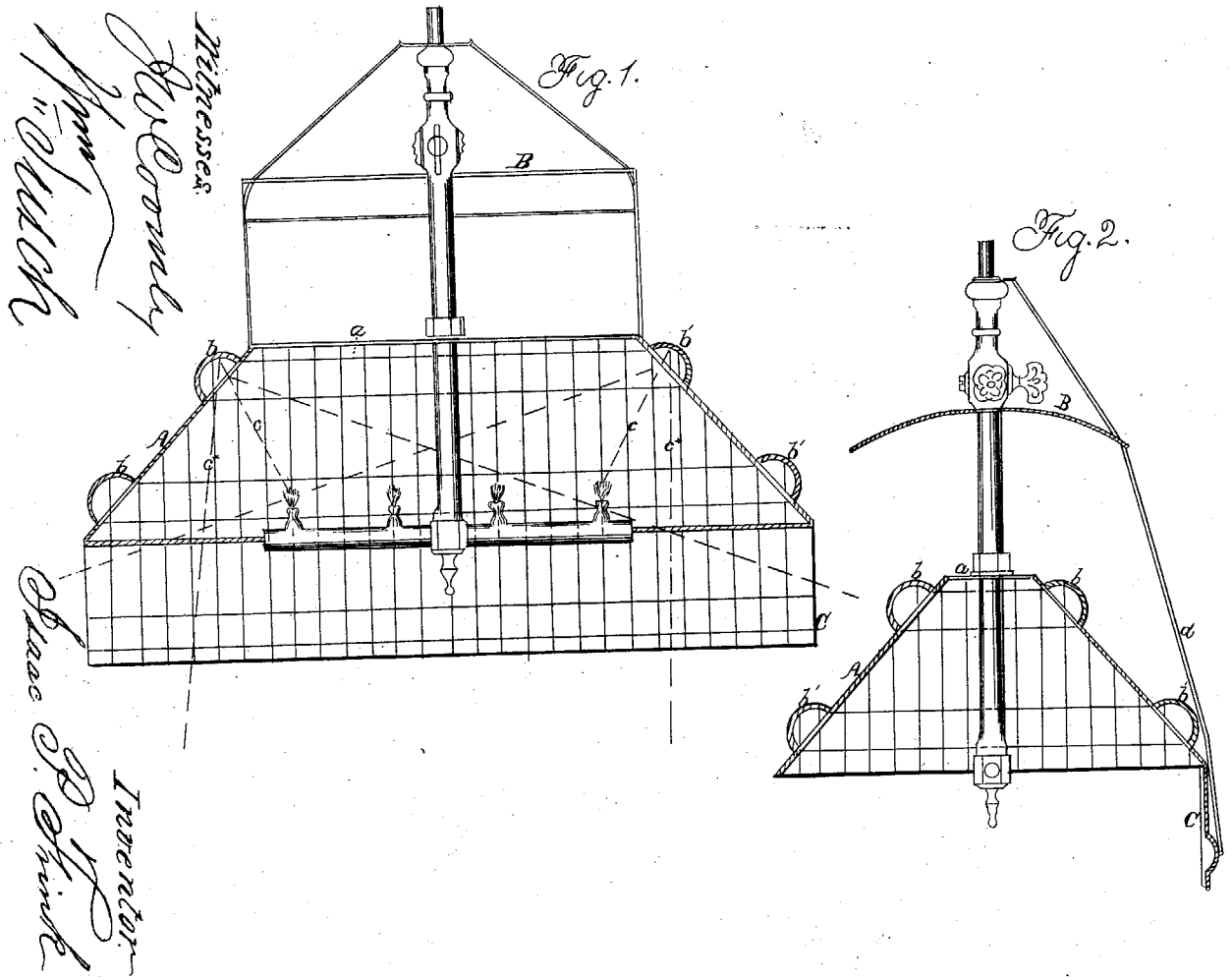
N. PETERS, PHOTO-LITHOGRAPHER, WASHINGTON, D. C.

UNITED STATES PATENT OFFICE.

ISAAC P. FRINK, OF NEWARK, NEW JERSEY.

IMPROVEMENT IN REFLECTORS.

Specification forming part of Letters Patent No. 27,898, dated April 17, 1860; Reissue No. 1,249, dated December 24, 1861.

*To all whom it may concern:*

Be it known that I, ISAAC P. FRINK, of Newark, in the county of Essex and State of New Jersey, have invented a new and Improved Reflector for Gas-Lights; and I do hereby declare that the following is a full, clear, and exact description of the same, reference being had to the annexed drawings, making a part of this specification, in which—

Figure 1 represents a longitudinal-vertical section of my invention; Fig. 2, a transverse vertical section of same.

Similar letters of reference indicate corresponding parts in the two figures.

A represents the body of the reflector, made of tinned sheet-iron or any other bright sheet metal, and which may be lined in the inside with glass or any other suitable material. The form of the body A is that of an oblong truncated pyramid, the sides being inclined at angles of about forty-five degrees, and an opening, *a*, in the top allows the necessary draft of air for the flames. A cover, B, is attached to the reflector at a certain distance over the opening *a*, and this cover may be curved in such a manner that all the rays of light which may strike it will be reflected down through the opening *a* in the top of the body A of the reflector. The sides of the body A of the reflector may be perfect planes, or they may be slightly concave at their inner sides. The cover B, instead of being curved, may be a plane surface, if desired, but the curved surface would be preferable. The body of the reflector is provided with beads *b b'*, near to its edges, and extending all around. The object of these beads is to catch those rays of light which would otherwise escape over the edges of the reflector. Rays of light *c*, in falling over the flat surface of the reflector, provided the sides are planes, would be reflected in the direction indicated by the dotted lines, but by means of the beads *b b'* they are reflected down in the direction indicated by the line $c^{\times}$. The beads *b' b'*, besides performing the above function, serve to strengthen the metal and to give to the whole an ornamented appearance.

The principal use of these reflectors is for gas-lights in show windows, and in order to be able to control the light to a certain extent, I have attached to the outside of the body of reflector a hinged section, C, made of the same materials as the body of the reflector itself, and arranged in such a manner that it can be adjusted to any desirable angle by means of the chains *d*. If it is desired to throw the light more to the goods at the back part of the window, this hinged section is brought in a vertical position, and if it is desired to direct more light to the goods immediately under the reflector, the hinged section is turned out so as to be in line, or nearly so, with the side of the reflector to which it is attached. This hinged section serves at the same time to protect the eyes of persons looking in from the outside, and it can be attached without materially increasing the cost of the whole reflector. The effect of these reflectors is unsurpassed, and a large quantity of the same have already been sold by me in this city and in other places during the last twelve months.

Having thus described my invention, what I claim as new, and desire to secure by Letters Patent, is—

1. The employment of an oblong pyramidal reflector, lined with glass or other diaphanous material, substantially as herein shown and described.

2. The combination of the cover B with a pyramidal reflector, substantially as herein shown and described.

3. The combination of the hinged adjustable section C with a pyramidal reflector, substantially as herein shown and described.

4. The combination of the beads *b b'* with a pyramidal reflector, substantially as herein shown and described.

5. The combination of the cover B and hinged adjustable section C with a pyramidal reflector, with or without the beads *b b'*, substantially as herein shown and described.

ISAAC P. FRINK.

Witnesses:

G. W. REED,

JAMES LAIRD.